(12) United States Patent
Renforth

(10) Patent No.: US 9,962,864 B2
(45) Date of Patent: May 8, 2018

(54) METHOD OF MOLDING PRODUCT HAVING HOLLOW INTERIOR REGION

(71) Applicant: Doskocil Manufacturing Company, Inc., Arlington, TX (US)

(72) Inventor: Jack Renforth, Azle, TX (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 254 days.

(21) Appl. No.: 15/058,618

(22) Filed: Mar. 2, 2016

(65) Prior Publication Data

US 2016/0257031 A1    Sep. 8, 2016

Related U.S. Application Data

(60) Provisional application No. 62/127,575, filed on Mar. 3, 2015.

(51) Int. Cl.
| | |
|---|---|
| *B29C 33/48* | (2006.01) |
| *B29C 33/76* | (2006.01) |
| *B29C 33/00* | (2006.01) |
| *B29C 33/30* | (2006.01) |

(52) U.S. Cl.
CPC ........ *B29C 33/485* (2013.01); *B29C 33/0033* (2013.01); *B29C 33/301* (2013.01)

(58) Field of Classification Search
CPC .. B29C 33/485; B29C 33/0033; B29C 33/301
USPC .................. 264/325.1, 334; 425/556, 403
See application file for complete search history.

(56) References Cited

U.S. PATENT DOCUMENTS

| | | | | |
|---|---|---|---|---|
| 2,320,583 | A * | 6/1943 | Forro | B29C 33/485 264/305 |
| 2,890,490 | A * | 6/1959 | Morin | B29C 33/485 164/340 |
| 4,861,257 | A * | 8/1989 | Siotani | B29C 33/485 249/175 |
| 4,912,609 | A * | 3/1990 | Gillette | F21S 8/035 362/147 |
| 2008/0315457 | A1* | 12/2008 | Ueki | B29C 33/485 264/299 |
| 2010/0044912 | A1* | 2/2010 | Zahlen | B29C 33/505 264/219 |
| 2014/0147547 | A1* | 5/2014 | Ueno | B29C 45/4421 425/556 |

* cited by examiner

*Primary Examiner* — Nahida Sultana
(74) *Attorney, Agent, or Firm* — Global IP Counselors, LLP

(57) ABSTRACT

A method of molding a product includes receiving into a cavity of a mold a core having a plurality of parts that are unconnected and that together form the core, situating a first part of a plurality of parts adjacent a second part of the plurality parts, receiving a material in an uncured state into a space between the mold and the core, forming with the first part a first portion of the interior region, forming with the second part a second portion of the interior region that is contiguous the first portion, removing the first part from within the first portion of the interior region, through a hole, and subsequent to the removing of the first part, removing the second part from within the second portion of the interior region, through a hole.

11 Claims, 2 Drawing Sheets

METHOD OF MOLDING PRODUCT HAVING HOLLOW INTERIOR REGION

CROSS-REFERENCE TO RELATED APPLICATIONS

This application claims priority to U.S. Provisional Application No. 62/127,575, filed Mar. 3, 2015, the contents of which is hereby incorporation herein by reference.

BACKGROUND

Field of Invention

Many articles are manufactured through molding processes. Several different molding processes are available when it is intended to manufacture a product with a hollow interior, and such molding operations would include blow molding, the use of a core within a mold, and other known methodologies.

Background of the Invention

When using a mold with an internal core, the core must be removed from within an interior region of the resultant molded product, and it is therefore known to employ cores that are frangible or are otherwise destroyed in order to remove the core from the interior region of the finished product. Destructible cores are typically employed when the finished product is relatively rigid and would prevent the removal of the core in an intact condition. However, if the finished product is relatively flexible, such as when the product is formed of a rubber-like polymeric compound, the finished product sometimes can be stretched or otherwise deformed to permit removal of the intact core. It is furthermore known, however, that the hot tear resistance and other elastic properties of polymeric materials are limited, and it is therefore understood that a product that is in a finished or semi-finished state can be deformed to at most only a limited extent before it tears or is otherwise destroyed. Improvements would there re be desirable in molding methodologies.

SUMMARY

It has been determined that molding a product with a hollow interior as described herein provides an improved process. In one disclosed embodiment, a method of molding a product having a hollow interior region and having a plurality of holes in communication between an interior region and an exterior of the product, the method includes receiving into a cavity of a mold a core having a first part and a second part that are unconnected and that together form the core, situating the first part adjacent the second part, inserting a material in an uncured state into a space between the mold and the core, at least partially curing the material, forming with the first part, a first portion of the interior region, forming with the second part, a second portion of the interior region, the second portion being contiguous with the first portion, removing the first part from within the first portion of the interior region, through a first hole of the plurality of holes, and removing the second part from within the second portion of the interior region, through at least one of the first hole and a second hole of the plurality of holes.

BRIEF DESCRIPTION OF THE DRAWINGS

Referring now to the attached drawings which form a part of this original disclosure.

DETAILED DESCRIPTION OF EMBODIMENTS

Figure 1:
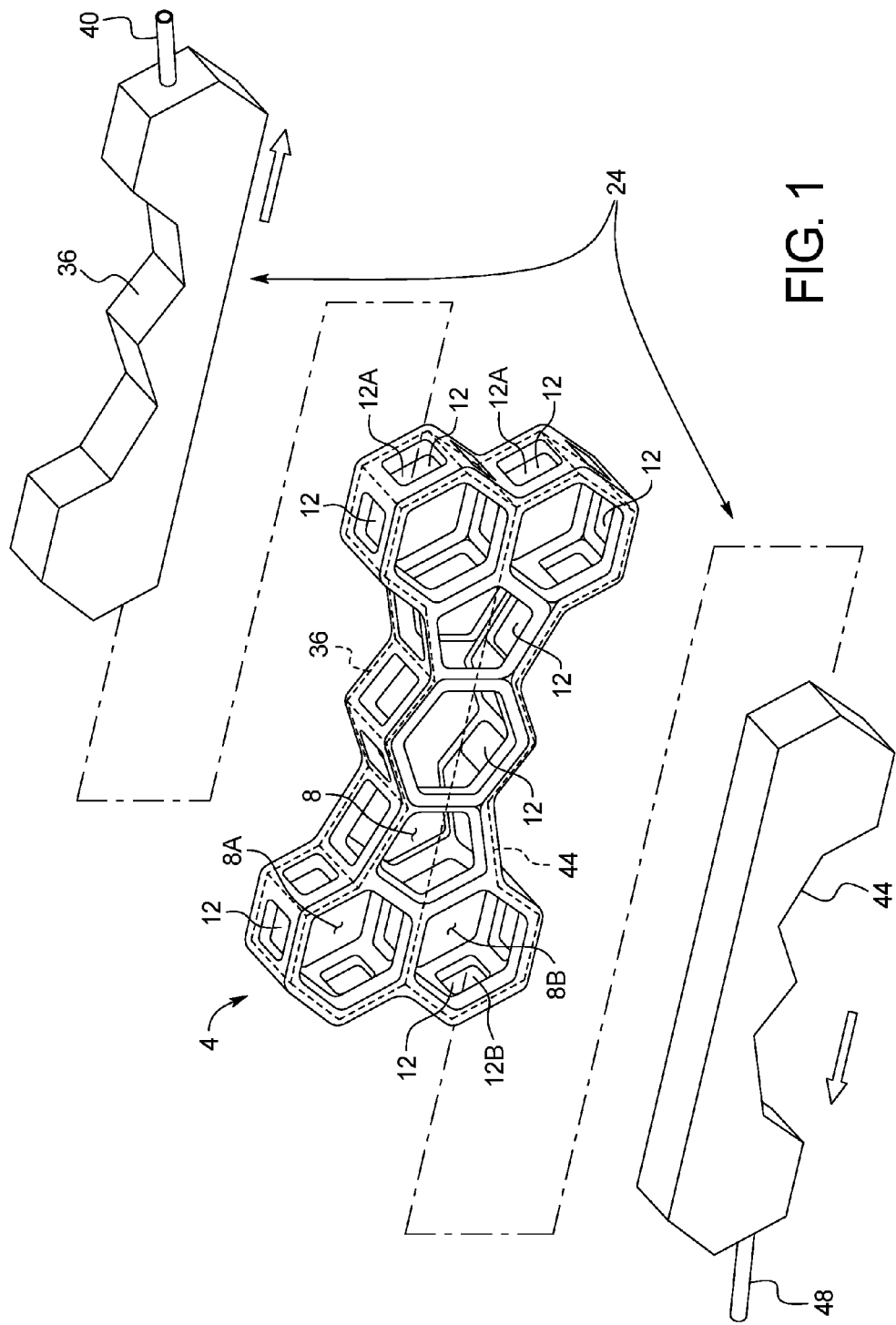
FIG. 1 illustrates an exploded view of the product and the core portions.

FIG. 1 depicts the process in which a product 4 having a hollow interior region 8 and having a plurality of holes 12 formed therein can be molded through the use of a two-part core 24. The holes 12 are in communication between the hollow interior region 8 and the exterior of the product 4.

Figure 3:
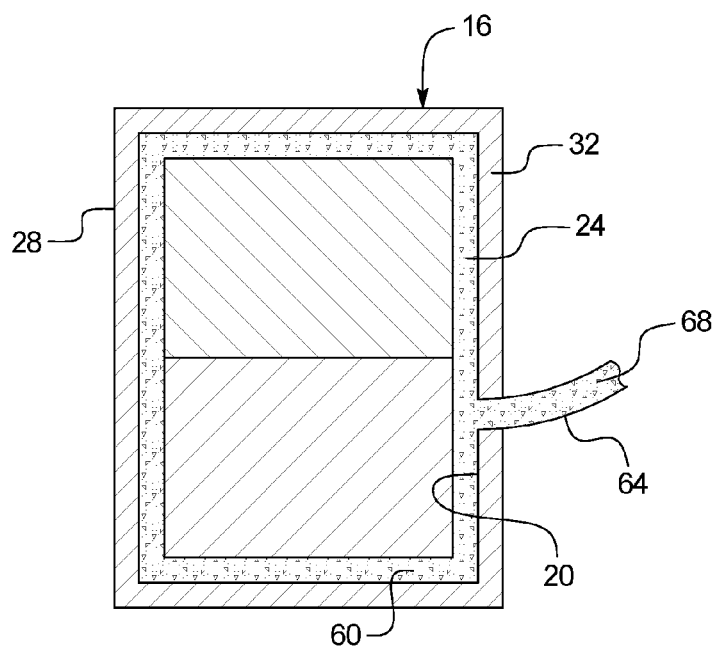
FIG. 3 is a cross-sectional view of the mold during the molding process.

More specifically, the product 4 is formed in a mold 16 such as is depicted generally in FIG. 3. The mold 16 has a hollow cavity 20 within which the core 24 is receivable. The core 24 can be supported in the cavity in any of a variety of fashions. The mold 16 itself includes a first mold portion 28 and a second mold portion 32 having the cavity 20 situated generally therebetween. The first and second mold portions 28 and 32 are separable to permit the core 24 to be received in the cavity 20 and to permit the product 4 and the core situated within its interior region 8 to be removed from the cavity 20.

Figure 2:
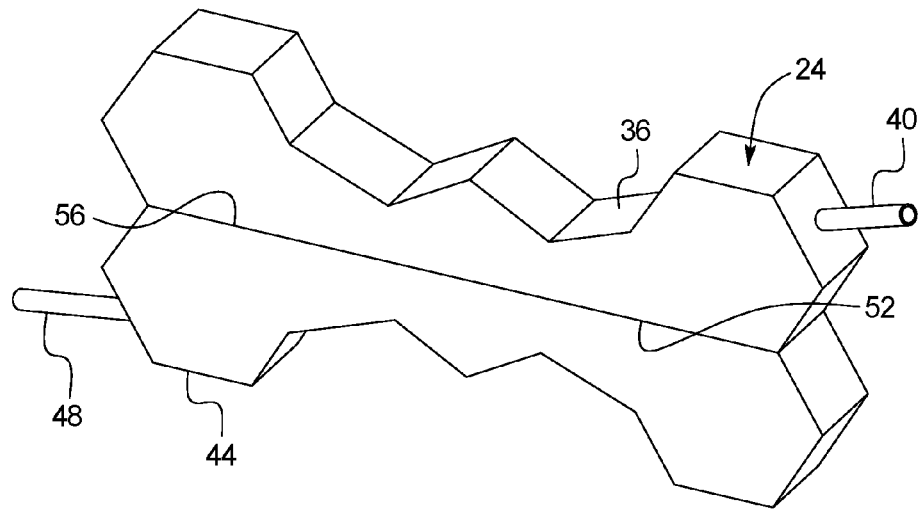
FIG. 2 illustrates the core portions positioned adjacent each other.

As can be understood from FIGS. 1-3, the core 24 can include a first core portion 36 to which is connected a first lug 40 and to further include a second core portion 44 to which is connected a second lug 48. The first core portion 36 has a first engagement surface 52 which is, in the depicted exemplary embodiment, of a substantially planar configuration. Likewise, the second core portion 44 in the depicted exemplary embodiment has a second engagement surface 56 that is of a substantially planar configuration.

The first and second engagement surfaces 52 and 56 are engaged together, such as is shown in FIGS. 2 and 3, when the first and second core portions 36 and 44 are received in the cavity 20. The first and second core portions 36 and 44 together form the hollow interior region 8 within the product 4 after the product 4 is formed. More particularly, the first core portion 36 can form a first portion 8A of the interior region 8, and the second core portion 44 can similarly form a second portion 8B of the interior region 8 that is contiguous first portion 8A.

When the first and second mold portions 28 and 32 are brought together with the core 24 supported within the cavity 20, a space 60 exists between the mold 16 and the core 24. An uncured polymeric material 68 can be introduced through a runner 64 into the space 60 to the space 60 to be filled with the uncured polymeric material 68. The uncured polymeric material 68 can then be caused to cure, in whole or in part, through any of a variety of processes such as heating, chemical transformation, and the like without limitation. When the polymeric material 68 has become sufficiently cured to be in a solid state of matter, the first and second mold portions 28 and 32 can be separated, and the product 4 with the core 24 situated in the interior region 8 thereof can be removed from the cavity 20. The core 24 can then be removed from the interior region 8.

As shown in the dotted lines in FIG. 1, the first and second core portions 36 and 44 are disposed in the interior of the product 4. The first core portion 36 may be removed through a first hole 12A, and the second core portion 44 may be removed through a second hole 12B, as illustrated by the dotted lines in FIG. 1. In so doing, it may be necessary to attach the first and second lugs 40 and 48 to the first and second core portions 36 and 44, such as by receiving the first and second lugs 40 and 48 through the first and second holes 12A and 12B, respectively, and connecting them with mating structures such as receptacles and the like on the first and second core portions 36 and 44. Alternatively, the first and second lugs 40 and 48 may be affixed to the first and second core portions 36 and 44 when the core 24 is supported in the cavity 20, in which case the first and second lugs 40 and 48 would be situated in the first and second holes 12A and 12B when the first and second mold portions 28 and separated. The first and second lugs 40 and 48 may be replaced with removable cables and clips that are flexibly and removably connectable with the first and second core portions 36 and 44.

In the depicted exemplary embodiment, the first and second core portions 36 and 44 are removed in opposite directions away from the product 4, although this need not be the case. By way of example, the second core portion 44 could alternatively be removed through a third hole 12C in approximately the same direction away from the product 4 as the first core portion 36 when it is removed through the first hole 12A. Furthermore, the first and second core portions 36 and 44 could be removed through the same hole 12 formed in the product 4 albeit at separate times. For instance, one of the first and second core portions 36 and 44 would typically need to be fully removed from the interior region 8 through the hole 12 and be situated fully at the exterior of the product 4 before the other of the first and second core portions 36 and 44 could be removed through the same hole 12.

By configuring the core 24 to have a plurality of parts, the overall core 24 can be relatively large in comparison with the sizes of the individual holes 12 while still being removable through one or more of the holes 12 without tearing or otherwise destroying the product 4. That is, a portion of each the first and second core portions 36 and 44 can be larger than the opening (or hole) through which the core portion is removed. Accordingly, the portion of the product 4 surrounding the opening (or hole) is able to stretch and allow the core portion to pass through the hole, by increasing the size of the opening or hole. Preferably, the product is formed from a resilient material that enables the product to stretch in this manner and retract to the original or desired shape without tearing or breaking. Depending upon the manufacturing process, it may be necessary to secure or otherwise hold the product 4 in place while the first and/or second core portions 36 and 44 are removed through one or more of the holes 12.

While the first and second core portions 36 and 44 are depicted herein as being substantially identical to one another, it can be understood that this need not be the case. Moreover, the core 24 can be formed of more than two parts without departing from the present concept, and the sizes of the various parts that form the core 24 can be chosen based upon the elastic properties of the product 4. It thus can further be understood that the product 4 need not necessarily be of a flexible polymeric material and rather may be relatively rigid. That is, depending upon the properties of the material from which the product 4 is formed, the core 24 can be formed of enough pieces of various sizes and shapes that they together form the interior region 8 in the product 4 but can be removed from within the interior region 8 without requiring meaningful deformation of the product 4 in order to effect such removal.

It therefore can be understood that the improved method of forming the product enables the core 24 to be formed of multiple parts and to be removed one piece at a time through one or more of the holes 12 in a fashion that enables the elastic limits or other properties of the product 4 to withstand the removal process without rupture or other failure. Other advantages will be apparent.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A method of molding a product having a hollow interior region and having a plurality of holes in communication between an interior region and an exterior of the product, the method comprising:
   receiving into a cavity of a mold a core having a first part and a second part that are unconnected and that together form the core;
   situating the first part adjacent the second part;
   inserting a material in an uncured state into a space between the mold and the core, at least partially curing the material;
   forming with the first part, a first portion of the interior region;
   forming with the second part, a second portion of the interior region, the second portion being contiguous with the first portion;
   removing the first part from within the first portion of the interior region, through a first hole of the plurality of holes; and
   removing the second part from within the second portion of the interior region, through at least one of the first hole and a second hole of the plurality of holes.

2. The method according to claim 1, wherein the removing of the first part and the removing of the second part being initiated at two different times.

3. The method according to claim 1, wherein, the removing of the first part and the removing of the second part including moving the first and second parts in two different directions away from the product.

4. The method according to claim 2, further comprising attaching two different structures to the first and second parts so as to move the first and second parts in the two different directions away from the product.

5. The method according to claim 1, wherein the two different structures are first and second lugs that attach to the first and second parts, respectively.

6. The method according to claim 5, wherein the first and second lugs are disposed in first and second holes of the plurality of holes, respectively.

7. The method according to claim 1, wherein
the removing of the first part includes removing the first through a first hole from among the plurality of holes.

8. The method according to claim 7, wherein
the removing of the second part includes removing the second through a second hole from among the plurality of holes.

9. The method according to claim 8, wherein
the removing the first part through the first hole includes changing a size of the first hole.

10. The method according to claim 9, wherein
the removing the second part through the second hole includes changing a size of the second hole.

11. The method according to claim 1, wherein
the first and second parts have substantially the same shape.

* * * * *